US006139333A

United States Patent [19]

Green et al.

[11] Patent Number: 6,139,333

[45] Date of Patent: Oct. 31, 2000

[54] CONNECTOR ASSEMBLY WITH SHUNTING SWITCH

[75] Inventors: Michael Patrick Green, Mechanicsburg; Sam Denovich, Harrisburg, both of Pa.

[73] Assignee: The Whitaker Corporation, Wilmington, Del.

[21] Appl. No.: 09/234,004

[22] Filed: Jan. 19, 1999

[51] Int. Cl.[7] ............................ H01R 29/00; H02B 1/056

[52] U.S. Cl. ............................ 439/49; 379/399; 439/510

[58] Field of Search ................................ 439/49, 507, 52, 439/510, 949, 512; 379/399; 200/51.03, 51.05

[56] References Cited

U.S. PATENT DOCUMENTS

| | | | |
|---|---|---|---|
| D. 347,618 | 6/1994 | Butler, III et al. | D13/133 |
| 4,979,209 | 12/1990 | Collins et al. | 379/399 |
| 5,007,888 | 4/1991 | Goutiere | 439/189 |
| 5,281,163 | 1/1994 | Knox et al. | 439/404 |
| 5,313,519 | 5/1994 | Mickelson et al. | 379/399 |
| 5,359,654 | 10/1994 | Jensen et al. | 379/397 |
| 5,381,050 | 1/1995 | Siclari et al. | 307/112 |
| 5,394,466 | 2/1995 | Schneider et al. | 379/399 |
| 5,414,765 | 5/1995 | Lanquist et al. | 379/399 |
| 5,420,920 | 5/1995 | Capper et al. | 379/399 |
| 5,450,469 | 9/1995 | Pamart et al. | 379/27 |
| 5,548,641 | 8/1996 | Butler et al. | 379/399 |
| 5,667,402 | 9/1997 | Denovich et al. | 439/409 |
| 5,785,458 | 7/1998 | Capper et al. | 439/409 |
| 5,901,220 | 5/1999 | Garver et al. | 379/399 |

FOREIGN PATENT DOCUMENTS

| | | | |
|---|---|---|---|
| 2 255 694 | 11/1992 | United Kingdom | H04L 12/28 |
| WO 95/32533 | 11/1995 | WIPO | H01R 13/703 |
| WO 95/32575 | 11/1995 | WIPO | H04M 1/02 |
| WO 96/25824 | 8/1996 | WIPO . | |

OTHER PUBLICATIONS

U. S. Serial No. 09/016,626, filed Jan. 30, 1998 (Abstract and drawings only).

*Primary Examiner*—Neil Abrams
*Assistant Examiner*—Hae Moon Hyeon

[57] ABSTRACT

Module (10) including a circuit board (30) having a first power-receiving connector (20) and a second power-receiving connector (42) and a power output connector (also 20). A shunt switch (60) is removably matable with posts (74) of the circuit board (30) in either of two orientations by simply being reversed in orientation, to interconnect circuits of the power output connector (20) with either the first power-receiving connector (20) or the second power-receiving connector (42). The module (10) is useful in an NIU and provides for an alternate source of power to the electronics elsewhere in the NIU as well as for voltage test probing of the power circuits (46,48) and testing of the electronics at test port connector (40), while the module also includes connectors (14) for connection of telephony distribution cable to subscriber premise wiring and test ports (16) for testing thereof.

7 Claims, 6 Drawing Sheets

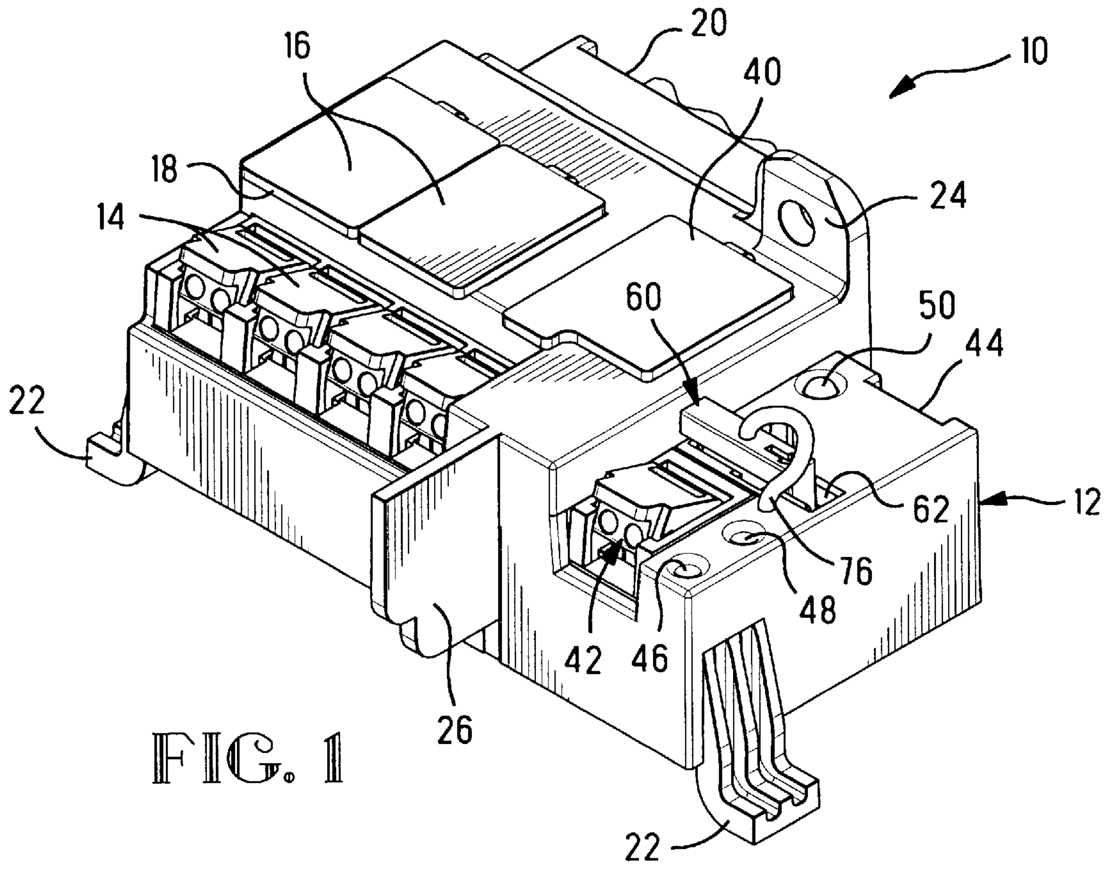
FIG. 1
FIG. 3
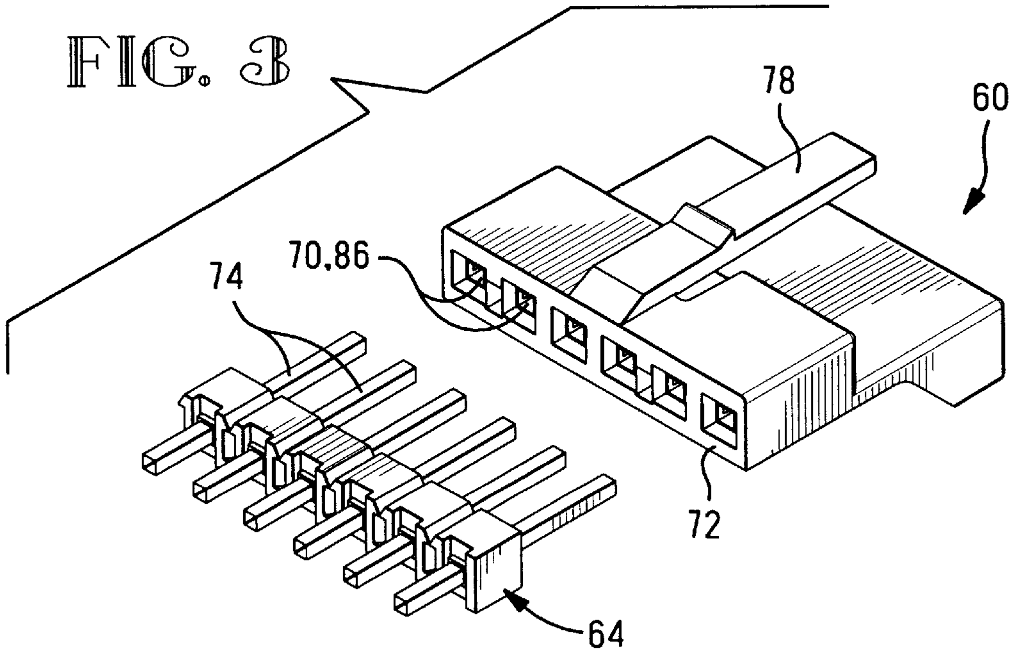

CONNECTOR ASSEMBLY WITH SHUNTING SWITCH

FIELD OF THE INVENTION

This relates to the field of electrical connectors and more particularly to connector assemblies that include switches.

BACKGROUND OF THE INVENTION

Network interface units (NIUs) are well known in the telephone industry as the interface between the telephone service provider and each subscriber. One example of such an NIU is shown in U.S. Pat. No. 4,979,209, having an enclosure installed at the subscriber location and serves as the demarcation point between the subscriber premise wiring and the telephone company distribution line. An NIU typically provides a subscriber section that is accessible to the subscriber and a service provider section that is restricted from access by the subscriber, but both sections are accessible to service representatives of the provider. The subscriber section provides a plurality of modules all connected to the main distribution cable for separate lines, usually for different subscribers, with the modules adapted for termination to ends of wires of the subscriber premise wiring.

Recently, NIUs have been devised that incorporate electronics necessary to receive fiber and coaxial signal connections, process the signals and establish a connection to subscriber premise wiring, a distinctly separate function from the telephony interconnection. Such electronics must receive appropriate electrical power to function, and is typically is either 60 VAC or 90 VAC Quasi-Square Wave. Certain coaxial distribution cables are of the type that integrally transmit appropriate levels of power, but provision must be made for alternate source of power to be utilized, such as a two-wire power conductor alongside the coaxial service drop.

In U.S. patent application Ser. No. 09/016,626 filed Jan. 30, 1998 and assigned to the assignee hereof, is disclosed a network interface module that is installable by accessing the subscriber section of the NIU, easily mechanically secured and electrically connected to the NIU in a single step, by latching into the enclosure, with the circuits to the main distribution cable being connected by an edge portion of a circuit card within the NIU being received into a connector of the module. Each module contains one connector for distribution circuit connection, at least one connector for subscriber wire connection, at least one test receptacle, and a ground bus connector also connectable to the circuit board of the NIU for grounding. Each subscriber wire connector includes a pivotable wire carrier that, upon insertion of ends of the tip and ring wires thereinto, is pivotable to urge the wire into an insulation displacement contact section for termination and electrical connection to circuits of the circuit board of the module. The module also is shown to include a gas protector for providing surge protection for the circuits of the module.

It is desired to provide a module that incorporates not only telephony connections to subscriber premise wiring but also test capability for electronics within the NIU associated with coaxial (CATV) connections to the subscriber, and additionally be programmable to provide power input to the electronics.

It is desired to provide such a module that accommodates either of two different sources of power utilized by the electronics.

SUMMARY OF THE INVENTION

The present invention provides a shunt switch defined by a removable and repositionable plug for a connector assembly, where the plug shunts first pairs of contact positions in a first orientation, and second pairs of contact positions in a second orientation. In the particular embodiment described, the plug can establish connections that couple either of two sources of power input, such as either from a coaxial cable in the first orientation, or from a two-conductor cable in the second orientation, The plug mates with a posted header within the module, commoning two selected pairs of posts in one orientation, and two different pairs of posts in the other orientation, with certain of the posts being connected by circuitry of a circuit board to the two sources of power, and certain others to power output circuits of the module.

An embodiment of the invention will now be described by way of example with reference to the accompanying drawings.

BRIEF DESCRIPTION OF THE DRAWINGS

FIG. 1 is an isometric view of a connector assembly utilizing the switch of the present invention;

FIG. 3 is an isometric view of the shunt switch of FIGS. 1 and 2;

DETAILED DESCRIPTION

Figure 2:
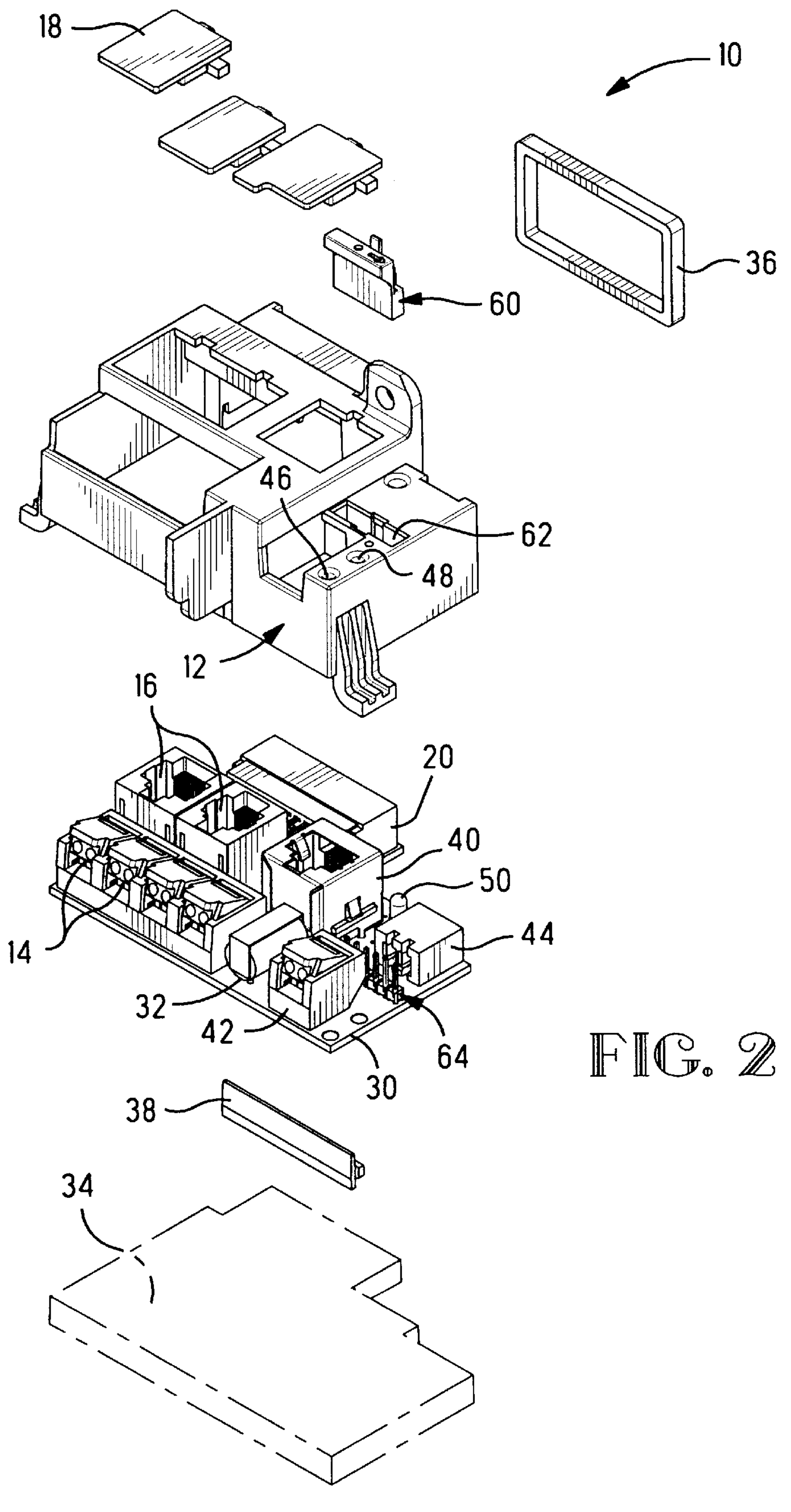
FIG. 2 is an isometric exploded view of the assembly of FIG. 1.

Network interface module 10 is shown to include an insulative housing body 12 in which are disposed a plurality of subscriber wire connectors 14, test ports 16 having sealing lids 18, and a distributor circuit connector 20. Housing body 12 is seen to have a pair of retention legs 22, a mounting flange 24 for application of a fastener (not shown) for mounting the module into an enclosure of a network interface unit (not shown), and a positioning flange 26. Within the module is a circuit board 30 for interconnecting the circuits of the various connectors, as seen in FIG. 2, and a gas protector 32 mounted to circuit board 30 for circuit surge protection. Potting material 34 is indicated in FIG. 2, that is disposed beneath the bottom surface of the circuit board after assembly of the module. A sealing gasket 36 is shown that surrounds the distribution circuit connector 20 for sealing around an opening through a panel within the enclosure when module 10 is mounted therein. Dam element 38 is utilized beneath the distribution connector 20 after placement of the circuit board into housing body 12 to close off the recess of the housing wall through which the distribution connector extends, to facilitate the potting process.

Each subscriber wire connector 14 is shown to be of the type having a pivotable wire carrier that is urgable downwardly to interconnect the inserted ends of tip and ring wires (not shown) of the premise wiring, to contacts within the module connected to circuits of circuit board 30 that extend to test ports 16 and ultimately to circuits of distribution connector 20. Network interface module 10 is installable by accessing the subscriber section of the NIU, being easily mechanically secured and electrically connected to the NIU in a single step, by being inserted into and mounted within the enclosure, with the circuits to the main distribution cable and the electronics being connected by edge portions of an electronics circuit card within the NIU being received into distribution connector 20 and ground connector 44 of the module.

Also seen in FIGS. 1 and 2 are a shielded RJ45 test port 40, an alternate power source connector 42, a ground bus connector 44, a pair of openings 46,48 comprising test ports for receipt of test probes, and an LED 50 that indicates the status of the electronics. Ground bus connector 44 is matable with a card edge extending from elsewhere in the NIU to provide grounding of the connectors and components of module 10. Test probe openings 46,48 provide for receipt of positive and neutral probes for testing of voltage levels being used during testing procedures.

Test port 40 is a shielded RJ45 jack connect to the electronics of the NIU for use in testing. The electronics (not shown) of the NIU include circuitry for receiving coaxial and/or fiber optic input of a CATV distribution cable, and providing electrical connections to the CATV premise wiring of the subscriber. Distribution connector 20, in addition to providing electrical connections of telephone premise wiring with connectors 14, and the testing thereof at test ports 16, is utilized to facilitate testing of the electronics elsewhere in the NIU by means of shielded data test port 40. Distribution connector 20 also provides for power, if any, received from the coaxial cable to be delivered to the module prior to transmission to the electronics, also performed by the distribution connector.

Shunt switch 60 is used for controlling the source of power from module 10 to the electronics of the NIU, and for routing the power through the gas protector to provide surge protection for all of the electronics and the subscriber premise wiring. The module provides that one source of power may be from the newer type of coaxial cable connections to the NIU, and power from this coax source is received into module 10 by means of selected circuits of connector 20. The other source of power is by means of connector 42; connector 42 provides for IDC termination of "hot" and neutral wires from a separate two-conductor power cable (not shown).

Figure 8:
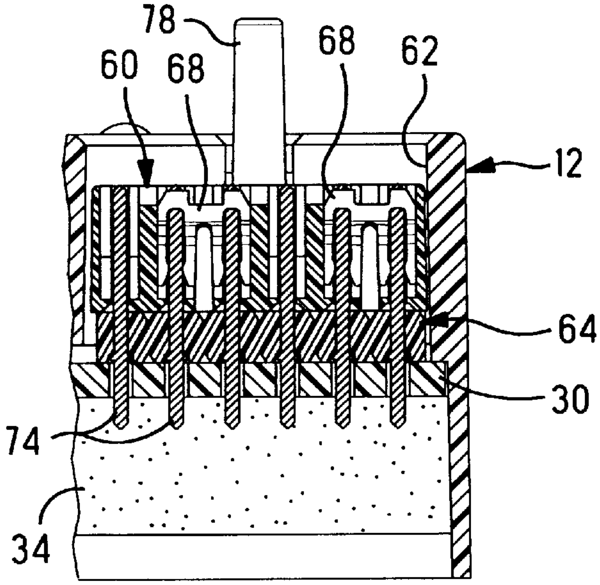
FIG. 8 is a cross-sectional view of the shunt switch in position in the assembly taken along lines 8—8 of FIG. 6.
Figure 6:
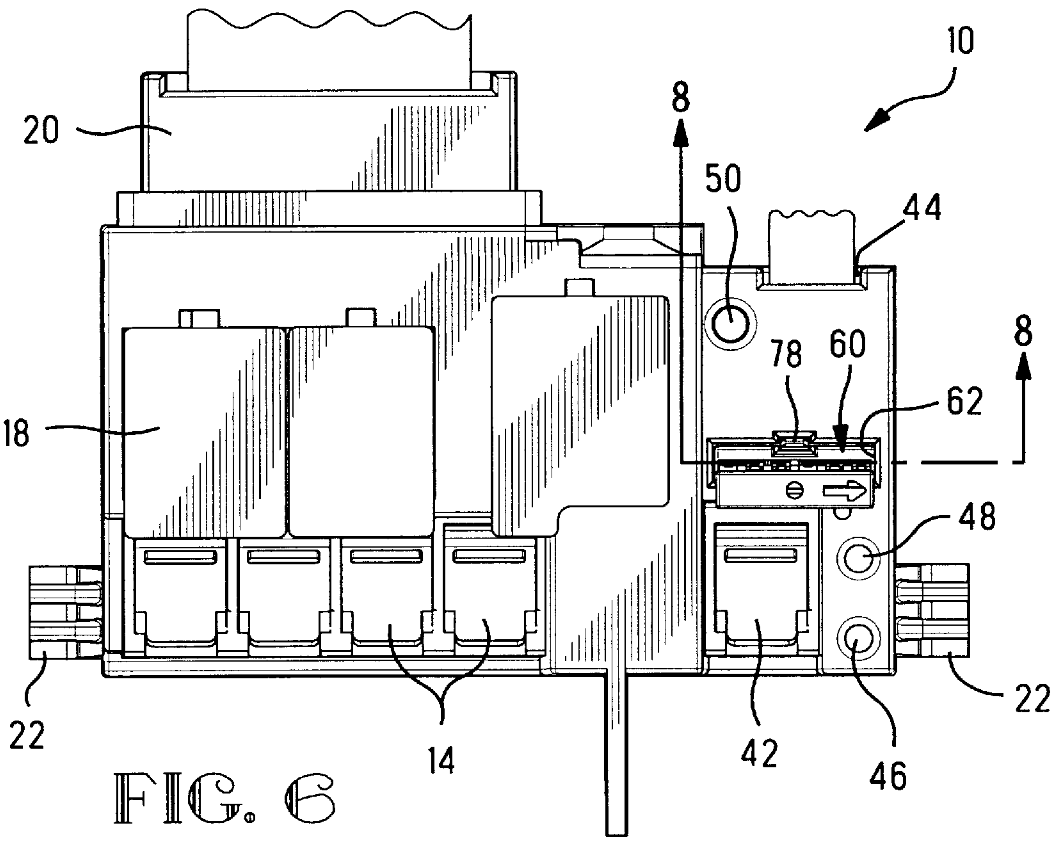
FIGS. 6 and 7 are top and elevation views of the assembly of FIGS. 1 and 2.
Figure 7:
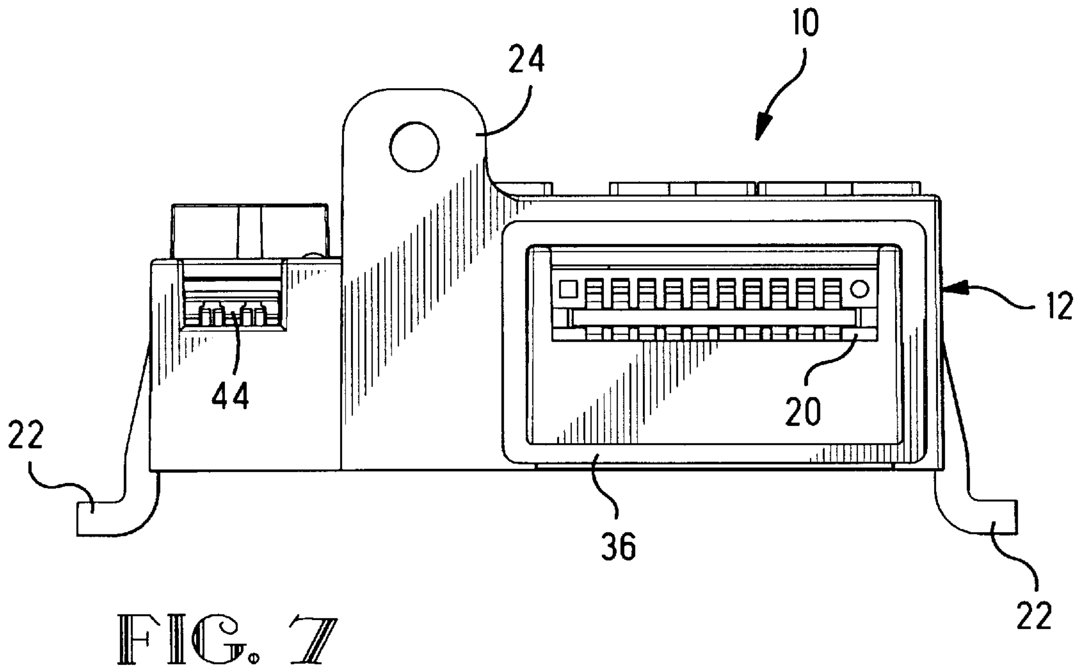

In FIGS. 2 to 5 is shown a shunt switch 60 that is insertable into module 10 through an opening 62 in the top surface of housing body 12, to mate with a post connector or header 64 mounted onto circuit board 30. Shunt switch 60 includes an insulative housing 66 in which are contained a plurality of shunt contacts 68 in respective passageways 70 that extend to a mating face 72. Shunt switch 60 is connectable to an array of terminals or posts 74 of connector 64, as seen in FIGS. 2 and 8. Shunt switch 60 is similar in construction to low profile shunt connector assembly sold under Part NO. 881545-1 by AMP Incorporated, Harrisburg, Pa. Preferably, a lanyard 76 physically attaches shunt switch 60 to module 10, and a manually deflectable latch arm 78 contains a latch projection for latching the shunt switch in its mated position in the module in a manner permitting manual delatching and removal when desired.

Figure 4:
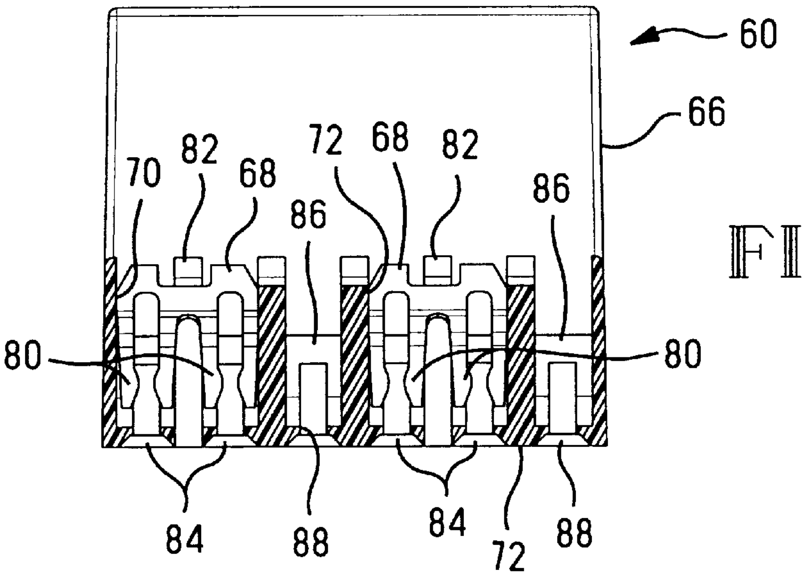
FIGS. 4 and 5 are cross-sectional views of the shunt switch of FIGS. 1 to 3.
Figure 5:
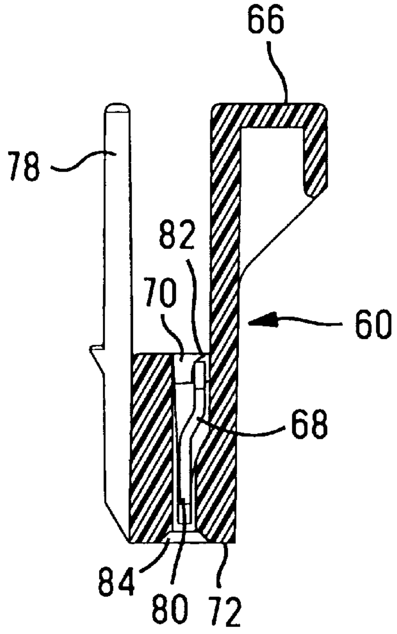
Figure 9:
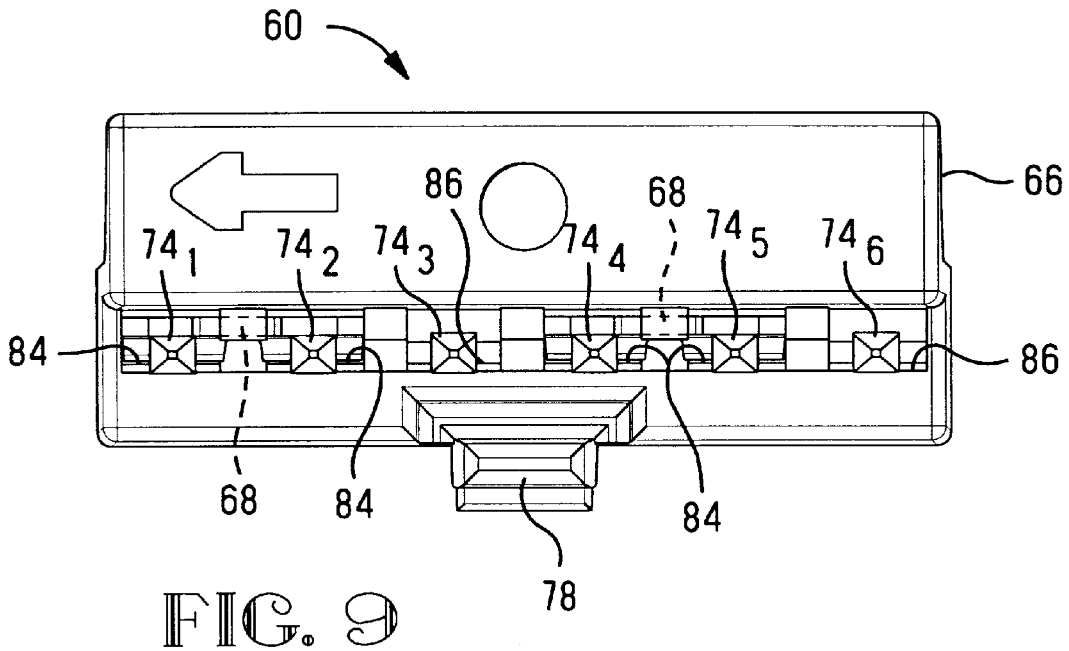
FIGS. 9 and 10 are top views of the shunt switch identifying the contact locations active in the two respective orientations of the switch.
Figure 10:
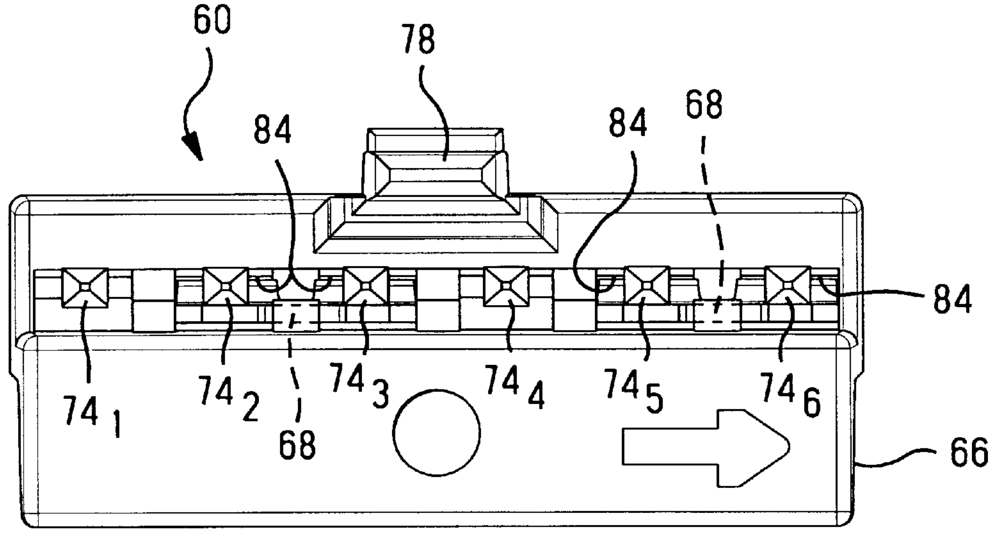

Referring to FIGS. 4 and 8, each contact 68 is shown to be a shunt contact that defines a pair of post-connecting sockets 80, for engaging and commoning a pair of adjacent posts 74. Contact 68 is retained in cavity 70 by snaplatching beneath a latch projection 82 of housing 66 upon full insertion during assembly, best seen in FIGS. 4 and 5. Post-connecting sockets 80 are recessed within post-receiving entrances 84 of passageways 70. Between passageways 70 and at one end of housing 66 are additional passageways 86 having post-receiving entrances 88, and post-receiving entrances 84,88 are spaced symmetrically along a common, centered row to correspond with the array of posts 76. FIGS. 4 and 9 indicate a first orientation of the shunt switch, while FIGS. 8 and 10 indicate the opposed or second orientation thereof. To facilitate the present discussion, the six posts are identified in FIGS. 9 and 10 by their positions, as $\mathbf{74}_1$, $\mathbf{74}_2$, $\mathbf{74}_3$, $\mathbf{74}_4$, $\mathbf{74}_5$, and $\mathbf{74}_6$, which correspond to circuits J10-1 to J10-6 in FIG. 11.

In the first shunt switch orientation of FIGS. 4 and 9, the arrangement of contacts 68 can be seen to common the posts in the first and second positions ($\mathbf{74}_1$, $\mathbf{74}_2$) and the fourth and fifth positions ($\mathbf{74}_4$, $\mathbf{74}_5$), proceeding from left to right. In the second shunt switch orientation of FIGS. 8 and 10, the contact arrangement commons the posts in the second and third positions ($\mathbf{74}_2$, $\mathbf{74}_3$) and the fifth and sixth positions ($\mathbf{74}_5$, $\mathbf{74}_6$) Thus it can be seen that the shunt switch can program the circuit board depending upon which orientation is selected when the shunt switch is inserted into its opening 62 of the housing body 12.

Figure 11:
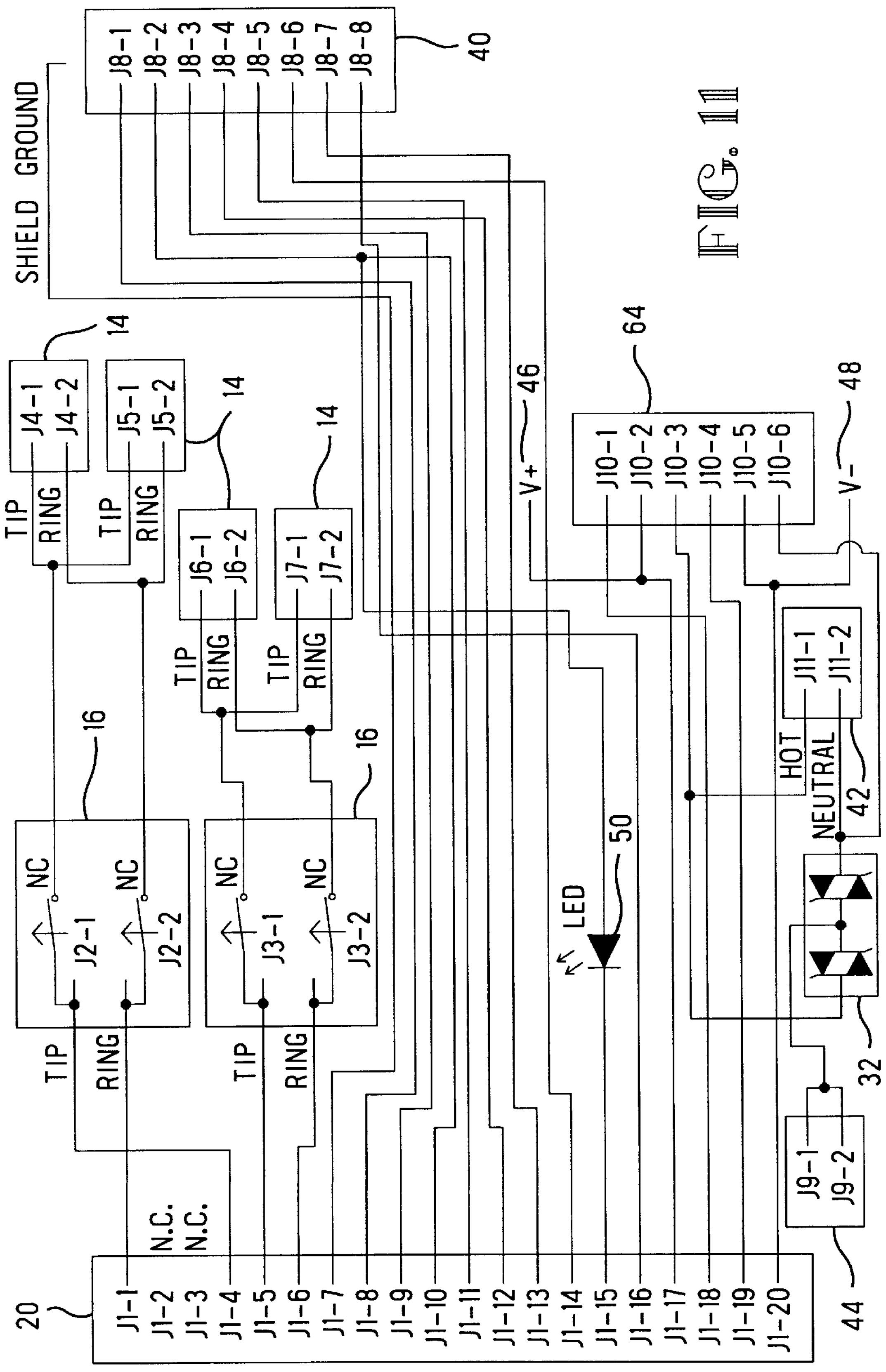
FIG. 11 is a circuitry schematic of the circuit board of the assembly of FIGS. 1 and 2 showing the electrical connections of the coaxial and twisted pair input locations with the shunt switch location and output locations.

In FIG. 11 are shown the circuitry of circuit board 30 of FIG. 2. Circuit-connecting hole arrays are designated in FIG. 11 to correspond to the connectors 14, 16, 20, 40, 42, 44 or gas protector 32 or voltage test probes 46,48 mounted to the circuit board at those positions.

It can be seen in FIG. 11 that holes corresponding to posts of post header connector 64 are interconnected selectively to input and output circuits of distribution connector 20 and to input circuits of alternate power source connector 42. More particularly, circuits of distribution connector 20 are selectively connected by the shunt switch to either the input circuits of connector 20 which serves as a first power input connector, or the input circuits from alternate power source connector 42 which serves as a second power input connector. The first position of post connector 64 is interconnected to one of the two power input circuits of connector 20. The second position is connected to the positive test probe port 46, and the fifth position is connected to the neutral test probe port 48. The second position is also interconnected to one of the two output circuits of connector 20. The third position is interconnected to gas protector 32 and indirectly to connector 42. The fourth position is interconnected to the other of the input circuits of connector 20. The fifth position is interconnected to test probe port 48 and to the other output circuit of connector 20. And the sixth position is interconnected to the gas protector 32, and thereby indirectly connected to connector 42.

When the first and second positions, and fourth and fifth positions, are commoned by the shunt switch, it can be seen that power from the coaxial cable is utilized via input circuits of distribution connector 20, and returning to output circuits of the distribution connector 20. When the second and third, and fifth and sixth positions, are commoned by the shunt switch, it can be seen that the power from the alternate power source is utilized via connector 42, passing through the gas protector 32 and extending to the distribution connector 20.

The module of the present invention thus incorporates the telephony subscriber premise wire connections and the power supplying and test capabilities for the electronics associated with the CATV subscriber premise wire connections contained elsewhere in the NYU, thus simplifying the assembly of the NIU and providing associated economies. The shunt switch of the present invention easily allows programming of the NIU to accommodate power from two different sources and also permits easy reprogramming, if desired.

What is claimed is:

1. A module comprising:

a circuit board, a first power input connector electrically connected to the circuit board for receipt of electrical power to the circuit board and transmission thereof to first input circuits of the circuit board, at least a second power input connector electrically connected to the circuit board for receipt of electrical power to the circuit board and transmission thereof to second input circuits of the circuit board, output circuits on the circuit board, terminals mounted on the circuit board electrically connected to respective ones of said first and second input circuits and said output circuits, and a shunt switch matable with said terminals in first and second orientations to selectively interconnect pre-selected first pairs of said terminals in said first orientation and pre-selected second pairs of said terminals in said second orientation, whereby said shunt switch in said first orientation electrically connects said first input circuits to said output circuits, and in said second orientation electrically connects said second input circuits to said output circuits.

2. The module as set forth in claim 1 wherein said first power input connector also is electrically connected to said output circuits.

3. The module as set forth in claim 1 wherein said module includes a gas protector incorporated into said second input circuits.

4. The module as set forth in claim 1 wherein said terminals electrically connected to said output circuits are also connected to test ports.

5. The module as set forth in claim 1 wherein said terminals are symmetrically positioned in a single row, and said shunt switch includes an insulative housing defining a single row of terminal-receiving positions symmetrically disposed along a mating face thereof.

6. The module as set forth in claim 5 wherein said terminals are posts and said terminal-receiving positions are apertures.

7. The module as set forth in claim 6 wherein at least two shunt contacts are disposed in respective passageways of said housing, each having a pair of socket sections for electrically engaging with respective said posts, and said pair of socket sections are disposed within adjacent said apertures in communication with a respective said passageway, and a first empty one of said apertures is positioned between said passageways in which are disposed socket sections of said at least two shunt contacts, and a second empty one of said apertures is disposed at one end of said row adjacent one of said passageways, all whereby said different ones of said posts are received into said first and second empty apertures when said shunt switch is mated with said terminals in said first and second orientations.

* * * * *